(12) United States Patent
Phan et al.

(10) Patent No.: US 11,321,519 B1
(45) Date of Patent: May 3, 2022

(54) DATA PARSING AND VERIFICATION IN A NETWORK ENVIRONMENT

(71) Applicant: Applied Statistics & Management Inc., Temecula, CA (US)

(72) Inventors: Nickolaus Taylor Phan, Temecula, CA (US); Daniel George Cairney, Temecula, CA (US)

(73) Assignee: APPLIED STATISTICS & MANAGEMENT INC., Temecula, CA (US)

( * ) Notice: Subject to any disclaimer, the term of this patent is extended or adjusted under 35 U.S.C. 154(b) by 0 days.

(21) Appl. No.: 16/116,826

(22) Filed: Aug. 29, 2018

(51) Int. Cl.
G06F 40/174 (2020.01)
G06F 40/226 (2020.01)
G06F 40/289 (2020.01)

(52) U.S. Cl.
CPC .......... *G06F 40/174* (2020.01); *G06F 40/226* (2020.01); *G06F 40/289* (2020.01)

(58) Field of Classification Search
IPC ....................................... G06F 17/243,17/2725
See application file for complete search history.

(56) References Cited

U.S. PATENT DOCUMENTS

| | | | | |
|---|---|---|---|---|
| 7,343,551 B1* | 3/2008 | Bourdev | ............... | G06F 17/243 715/224 |
| 7,418,656 B1 | 8/2008 | Petersen | | |
| 2004/0181749 A1* | 9/2004 | Chellapilla | ........ | G06K 9/00449 715/222 |
| 2005/0198563 A1* | 9/2005 | Kristjansson | ......... | G06F 40/174 715/224 |
| 2012/0054593 A1* | 3/2012 | Naderi | .................. | G06F 40/174 715/224 |
| 2012/0150806 A1* | 6/2012 | Barsness | ........... | G06F 17/30297 707/646 |
| 2013/0013489 A1* | 1/2013 | Kremen | ............... | G06Q 40/025 705/38 |
| 2013/0198599 A1* | 8/2013 | Kumar | .................. | G06F 17/245 715/227 |
| 2013/0262474 A1* | 10/2013 | Curran | ................... | G16H 50/70 707/748 |
| 2015/0154316 A1* | 6/2015 | Lightner | ........... | G06F 17/30312 707/723 |
| 2015/0248392 A1* | 9/2015 | Watanabe | ............. | G06F 17/243 715/226 |

(Continued)

*Primary Examiner* — Scott T Baderman
*Assistant Examiner* — Steve P Golden
(74) *Attorney, Agent, or Firm* — Knobbe Martens Olson & Bear, LLP

(57) ABSTRACT

Systems and methods are provided for parsing, verifying, and supplementing user-submitted data and pre-populating the information detected in the user-submitted data into a user-fillable electronic form. For example, the user may upload a cumulative vitae (CV) onto a system, and the system may analyze the CV to extract the date ranges and the corresponding entities enumerated in the CV. The system may confirm the information about the extracted entities in a database of entities, and pre-populate an electronic form using the confirmed information. Upon viewing the electronic form, the user may make any changes as needed before submitting the electronic form. Based on the changes made by the user, the system can update its data parsing and/or verification techniques using machine learning.

24 Claims, 6 Drawing Sheets

(56) References Cited

U.S. PATENT DOCUMENTS

2015/0286747 A1* 10/2015 Anastasakos ..... G06F 17/30917
          707/776
2015/0317296 A1* 11/2015 Vohra ................ G06F 17/30011
          715/221
2015/0317610 A1* 11/2015 Rao ................... G06Q 10/1053
          705/321

* cited by examiner

DATA PARSING AND VERIFICATION IN A NETWORK ENVIRONMENT

TECHNICAL FIELD

This disclosure relates to the field of data parsing, and particularly to techniques for parsing, verifying, and supplementing user-submitted data, and for pre-populating electronic forms, in a network environment.

BACKGROUND

Electronic data records are increasingly used in industries that conventionally relied on paper records. Such electronic data records can be generated by a human operator by manually typing the information included in a physical document into a fillable electronic form. In some cases, optical character recognition (OCR) is used to convert the information in a scanned copy of the physical document into machine-readable text.

SUMMARY

Various techniques for parsing, verifying, and supplementing user-submitted data and for pre-populating electronic forms are described herein. For example, a system implementing these techniques can parse a user-submitted document and extract text strings that represent the names of institutions, establishments, and/or organizations and the date ranges for which the user was or has been affiliated with such entities. The system can identify those entities in a database storing information about a wide variety of entities gathered from various data sources. Once the entities are identified in the database, the system can pre-populate certain information about those entities in an electronic form presented to the user. The user can further verify the information pre-populated in the electronic form and make any changes as necessary. The changes made by the user can be fed back to the system to improve the entity identification process.

BRIEF DESCRIPTION OF THE DRAWINGS

The embodiments described herein are illustrated by way of example, and not by way of limitation, in the figures of the accompanying drawings in which like references indicate similar elements.

FIG. 4 is an example user interface showing the information pre-populated into an electronic form in accordance with aspects of the present disclosure.

FIG. 6 is an example user interface showing a user interface element for selecting one of multiple entity information options in accordance with aspects of the present disclosure.

DETAILED DESCRIPTION OF EXAMPLE EMBODIMENTS

Introduction

Figure 1:
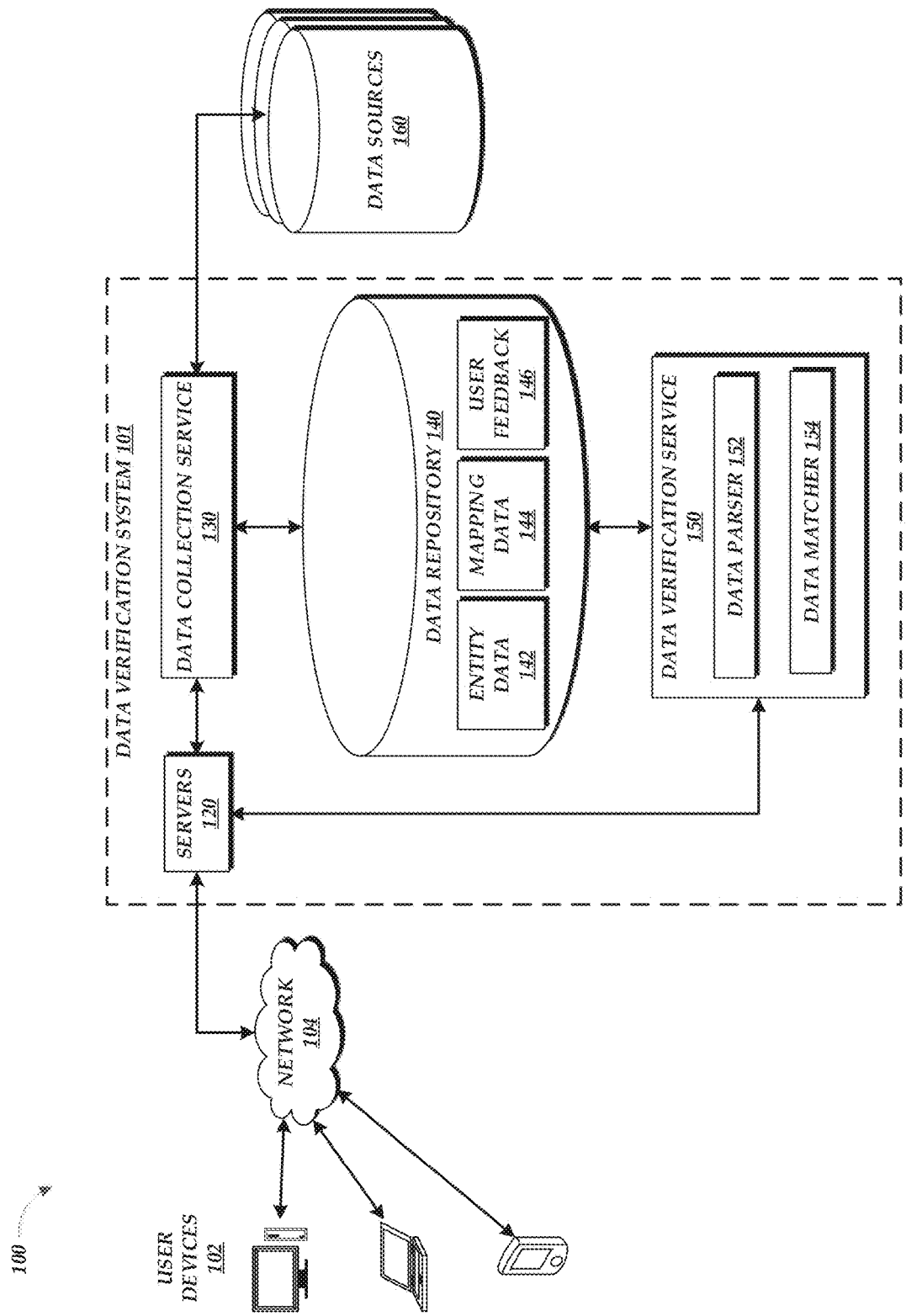
FIG. 1 is a block diagram depicting an illustrative network environment for parsing and matching user-submitted data in accordance with aspects of the present disclosure.

Completing an electronic form, such as a Web form, with a large number of text fields can be burdensome and time consuming, especially if the user completing the electronic form needs to refer to other electronic or paper documents to be able to fill out the text fields. For example, if a user wishes to apply for a job online, the user may be asked to fill out a lengthy Web form about his or her educational and employment history. Further, the task of filling out such electronic forms is prone to human error. Thus, an improved data entry method that is less time-consuming and more accurate is desired.

Technical Advantages

With an improved data parsing and verification system according to the present application, the user may be able to upload an electronic document, such as the user's curriculum vitae (CV), that includes information that needs to be entered into an electronic form. The system can then extract and verify the relevant data elements, and if necessary, use this data to look up additional data (such as the addresses of identified schools and organizations) that is required to complete the electronic form. The system then can pre-populate some or all of the fields of the electronic form for presentation to the user, optionally with confidence level indicators for specific fields. Such an improved data parsing and verification system can eliminate or reduce the need to type into electronic forms.

Filling out electronic forms can be especially difficult on a mobile device with a small display. For example, on a smartphone, the user may need to scroll around the page and switch between modes many times (e.g., from a view mode that allows the user to view the information on the page without a digital keyboard displayed on the screen, to a text entry mode that allows the user to enter information into a fillable text field via an on-screen digital keyboard). The improved data parsing and verification system according to the present application can eliminate or reduce the amount of time spent on switching between modes and typing on the on-screen keyboard.

The improved data parsing and verification system can also improve the accuracy of the data entered into the electronic form by verifying the data against a database of known information. For example, before pre-populating an electronic form with data extracted or determined from a user's CV, the improved data parsing and verification system may verify that the entities listed in the CV actually exist, by accessing a database of known entities (e.g., schools, companies, hospitals, etc.). In some cases, the improved data parsing and verification system can auto-populate the electronic form with information that is not included in the CV (or other document) by accessing the database of known entities and retrieving additional information about a particular entity that is not included in the CV. Such additional information can be pre-populated in the electronic form for further review by the user. For example, if the CV of a user includes the name of the hospital the user was affiliated with but does not include the address and phone number of the hospital, the improved data parsing and verification system can access a database of hospitals, retrieve the address and phone number of the hospital, and include the retrieved information in the electronic form presented to the user.

In some implementations, the improved data parsing and verification system can also verify that the user is actually qualified to list the entities in his or her CV. For example, if the CV of the user lists the schools she attended, the hospitals at which she was employed, and the medical licenses she currently holds, the improved data parsing and verification system access one or more databases corresponding to the schools, hospitals, and the licensing boards to verify that the user was or is affiliated with such entities in the manner described in the CV.

Overview of Example Network Environment

The illustrative network environment 100 shown in FIG. 1 includes a data verification system 101 according to one embodiment. The data verification system 101 enables a user to submit an electronic document and have the relevant information in the electronic document (and if applicable, related data retrieved from other sources) automatically entered into one or more data fields of a fillable electronic form that the user would otherwise need to complete manually (e.g., by typing the information on a physical or digital keyboard). For example, the user may upload a copy of his or her CV onto the data verification system 101, and the data verification system 101 may extract the relevant information about the user's education and employment history to automatically complete the education and employment sections of an electronic job application form without the user having to type the information into the form. The data verification system 101 may also use related data retrieved from other data sources (organization websites, business directories, etc.) to complete certain fields.

By way of illustration, various example user devices 102 are shown in communication with the data verification system 101 via network 104. The user devices 102 can be any computing device such as a desktop, a laptop, a mobile phone (or smartphone), a tablet, a kiosk, a television, a wristwatch (including a smartwatch), a wireless device, a media player, one or more processor devices, integrated circuit components for inclusion in computing devices, and the like.

The network 104 over which the user devices 102 can access the data verification system 101 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks.

In the depicted embodiment, the data verification system 101 includes servers 120, which can communicate with the user devices 102 over the network 104 and provide access to various services of the data verification system 101. In the example of FIG. 1, the services provided by the data verification system 101 include a data collection service 130 and a data verification service 150. In some embodiments, these services can be implemented as software components executing in physical computer hardware on the servers 120 or in separate computing devices.

The data collection service 130 can access data sources 160 and collect data relating to various entities and store the data in a data repository 140. The term "entity" as used herein, in addition to having its ordinary meaning, can refer to any institution, establishment, or organization with which a user can be associated or affiliated. For example, an entity may be a medical school that the user attended, a licensing board from which the user received a medical license, or a hospital where the user previously worked. Although some embodiments are described in the context of medical practitioners, the techniques of the present disclosure can be applied to any other field or purpose.

The data sources 160 can include public or private databases (e.g., those provided by websites such as Medicare.gov or the National Provider Identifier [NPI] Registry) that provide various lists of known or available entities and the information associated with those entities such as the name, mailing address, phone number, and the like. For example, the data sources 160 may include a list of hospitals provided on a government website or database, a list of medical schools provided on a medical school ranking website or database, a public database of medical licenses provided by a state medical board, and the like. The data sources 160 may provide application programming interfaces (APIs) that may be called by the data collection service 130 to access the data stored thereon. For example, the data collection service 130 may access data from Centers for Medicare and Medicaid Services (CMS) National Plan and Provider Enumeration System (NPPES) using the APIs provided at https://npiregistry.cms.hhs.gov/registry/help-api, using a search user interface provided at https://npiregistry.cms.hhs.gov/, or by downloading the files at http://download.cms.gov/nppes/NPI_Files.html. As another example, the data collection service 130 may access data from Medicare.gov by using the search user interface, exportable/downloadable files, or APIs provided at https://data.medicare.gov/Hospital-Compare/Hospital-General-Information/xubh-q36u. As another example, the data collection service 130 may access data from the National Technical Information Service (NTIS) Drug Enforcement Administration (DEA) by downloading the files at https://dea.ntis.gov/. In other examples, the data collection service 130 may use screen scraping to capture data provided on a web site.

The data collection service 130 may store the data accessed from the data sources 160 in the data repository 140 as entity data 142. In some embodiments, the data collection service 130 may access the data sources 160 based on an update frequency associated with the respective data sources 160. For example, the data collection service 130 may access one data source quarterly based on its quarterly update schedule, and access another data source monthly based on its monthly update schedule. The data collection service 130 may periodically access a predefined set of third party web sites or other data sources to search for new entity names, addresses, etc. and to update the data repository 140 based on any new entity names, addresses, etc. found from the third party websites or other data sources. As shown in FIG. 1, the data repository 140 can also include mapping data 144 and user feedback 146, which are described in greater detail below with reference to FIG. 5.

The data verification service 150 may implement a data verification method by which user-submitted data is parsed and matched against a database of known entities such that a fillable electronic form is pre-populated with any matching entities, thereby reducing or eliminating the need for a user to manually type data into the electronic form. The user-submitted data may include any text, image, or other data including or indicating information that may be used to complete an electronic form. For example, the user may upload or otherwise send (e.g., from the user's laptop, tablet, or mobile phone) to the data verification system 101 a photograph or scan of the user's CV or résumé (in which case the system may apply OCR to the photograph or scan). The user may alternatively upload or send the CV or résumé as a text file, a Word document, or an electronic document in another format.

In the example of FIG. 1, the data verification service 150 includes a data parser 152 and a data matcher 154 that may be used to implement various aspects of the present disclosure, such as extracting date information and entity information from user-submitted data, matching the entity information against known entities, outputting a user interface including pre-populated information based on the matching, and other aspects discussed herein.

The data parser 152 can take the user-submitted data as input and break up the user-submitted data into parts for further processing by the data matcher 154. For example, the user-submitted data may be a copy of a user's CV, and the data parser 152 may convert the content of the CV into a text string, and divide the text string into smaller text strings that each include one or both of a date range and an entity corresponding to the date range. For example, the CV may indicate that the user attended University of California, Irvine (UCI) (entity 1) from 2004 to 2008 (date range 1), attended University of California, Los Angeles (UCLA) School of Medicine (entity 2) from 2008 to 2012 (date range 2), and so on. The data parser 152 may extract "2004-2008" from the CV and tag the text string as a first date range, extract "UCI" from the CV and tag the text string as a first entity that corresponds to the first date range, extract "2008-2012" from the CV and tag the text string as a second date range, and extract "UCLA School of Medicine" from the CV and tag the text string as a second entity that corresponds to the second date range, etc.

The data matcher 154 can take the entities identified in the CV and match them against the entity data 142 in the data repository 140. For example, the data matcher 154 may search the entity data 142 for any entities including the text string "UCI" and determine that "University of California, Irvine, 260 Aldrich Hall Irvine, Calif. 92697" is the closest match in the entity data 142. Further, the data matcher 154 may search the entity data 142 for any entities including the text string "UCLA School of Medicine" and determine that "David Geffen School of Medicine at UCLA, 10833 Le Conte Ave, Los Angeles, Calif. 90095" is the closest match in the entity data 142. In some cases, the mapping data 144 may indicate that the text string "UCI" should be matched with "University of California, Irvine, 260 Aldrich Hall Irvine, Calif. 92697" and the text string "UCLA School of Medicine" should be matched with "David Geffen School of Medicine at UCLA, 10833 Le Conte Ave, Los Angeles, Calif. 90095." Although the entity data 142 is described in this example to include text strings, in other examples, the entity data 142 may include a plurality of database entries that each correspond to a known entity, wherein each database entry is associated with the name of the known entity (e.g., "David Geffen School of Medicine at UCLA"), the address of the known entity (e.g., "10833 Le Conte Ave, Los Angeles, Calif. 90095"), and so on. As discussed further below with reference to FIG. 4, the data matcher 154 may cause a fillable electronic form to be pre-populated based on the matching entities found in the entity data 142. The techniques for parsing and matching the user-submitted data are described in greater detail below with reference to FIGS. 3-6. In some embodiments, the data verification system 101 may include other components not illustrated in FIG. 1.

The data verification system 101 is depicted in FIG. 1 as operating in a distributed computing environment including several computer systems that are interconnected using one or more computer networks. The data verification system 101 could also operate within a computing environment having a fewer or greater number of devices than are illustrated in FIG. 1. Thus, the depiction of data verification system 101 in FIG. 1 should be taken as illustrative and not limiting to the present disclosure. For example, the data verification system 101 or various constituents thereof could implement various Web services components, hosted or "cloud" computing environments, and/or peer to peer network configurations to implement at least a portion of the processes described herein.

Further, the data verification system 101 may be implemented in hardware and/or software and may, for instance, include one or more physical or virtual servers implemented on physical computer hardware configured to execute computer executable instructions for implementing the various features described herein. The one or more servers may be geographically dispersed or geographically co-located, for instance, in one or more data centers.

Moreover, the processing of the various components or services of the data verification system 101 can be distributed across multiple machines, networks, or other computing resources. The various components or services of the data verification system 101 can also be implemented in one or more virtual machines or hosted computing environment (e.g., "cloud") resources, rather than in dedicated servers. Likewise, the data repositories shown can represent local and/or remote, physical and/or logical data storage, including, for example, storage area networks or other distributed storage systems. In some embodiments, the connections between the components or services shown represent possible paths of data flow, rather than actual connections between hardware. Executable code modules that implement various functionalities of the data verification system 101 can be stored in the memories of the servers 120 and/or on other types of non-transitory computer-readable storage media. While some examples of possible connections are shown, any subset of the components shown can communicate with any other subset of components in various implementations.

Example Architecture of Data Verification Service

Figure 2:
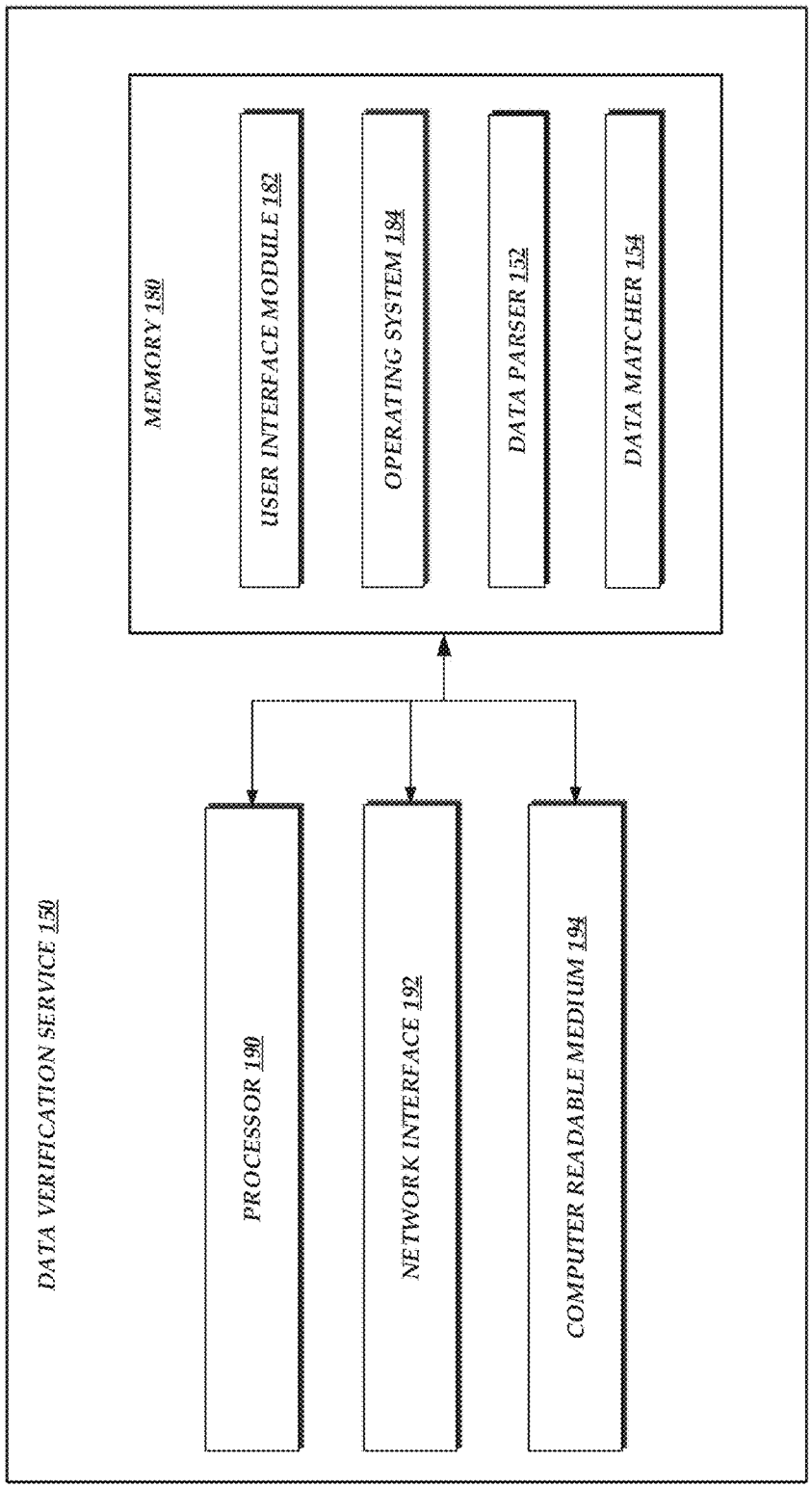
FIG. 2 depicts a general architecture of a computing device or system providing a data verification service for parsing and matching user-submitted data in accordance with aspects of the present disclosure.

FIG. 2 depicts an example architecture of a computing system (referenced as data verification service 150) that can process and verify the information included in a user-submitted document. The general architecture of the data verification service 150 depicted in FIG. 2 includes an arrangement of computer hardware and software modules that may be used to implement one or more aspects of the present disclosure. The data verification service 150 may include many more (or fewer) elements than those shown in FIG. 2. It is not necessary, however, that all of these elements be shown in order to provide an enabling disclosure. As illustrated, the data verification service 150 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 184 that provides computer program instructions for use by the processor 190 in the general administration and operation of the data verification service 150. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device. In addition, the memory 180 may include or communicate with one or more data stores (e.g., data repository 140).

In addition to and/or in combination with the user interface module 182, the memory 180 may include the data parser 152 and the data matcher 154 that may be executed by the processor 190. In one embodiment, the user interface module 182, data parser 152, and data matcher 154 individually or collectively implement various aspects of the present disclosure, e.g., parsing, matching, and/or verifying user-submitted data and generating and/or outputting a UI based on the user-submitted data, as described further below.

While the data parser 152 and the data matcher 154 are shown in FIG. 2 as part of the data verification service 150, in other embodiments, all or a portion of a data parser and/or a data matcher may be implemented by other components of the data verification system 101 and/or another computing device. For example, in certain embodiments of the present disclosure, another computing device in communication with the data verification system 101 may include several modules or components that operate similarly to the modules and components illustrated as part of the data verification service 150. It will also be appreciated that, in some embodiments, a user device may implement functionality that is otherwise described herein as being implemented by the elements and/or modules of the data verification service 150. For example, the user device 102 may receive code modules or other instructions from the data verification service 150 and/or other components of the data verification system 101 via the network 104 that are executed by the user device 102 to implement various aspects of the present disclosure.

Data Parsing and Matching Method

Figure 3:
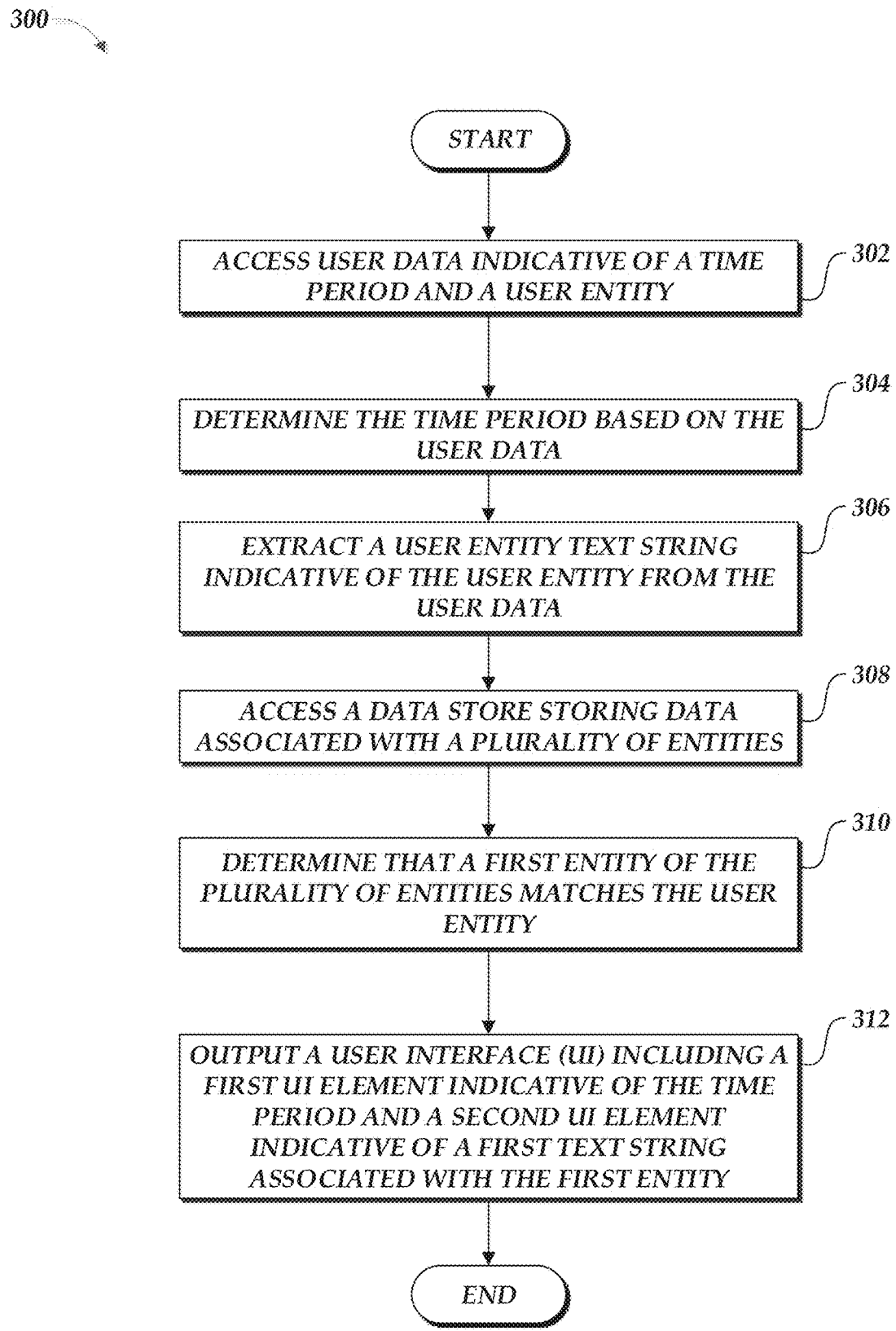
FIG. 3 is a flow diagram illustrating an example method for detecting date ranges and entities in user-submitted data in accordance with aspects of the present disclosure.

FIG. 3 is a flow diagram of an illustrative method 300 implemented at least in part by the data verification service 150 for parsing and verifying the time periods and entities in user-submitted data. While the illustrative method will be described below as being implemented by one or more components of the data verification system 101 (e.g., data verification service 150), in other embodiments, one or more of the illustrated steps may be implemented by a component of the data verification system 101 not shown in FIG. 1 or another computing system not shown in FIG. 1. For convenience, the steps of the example method 500 are described as being performed by the data verification service 150.

At block 302 of the illustrative method 300, the data verification service 150 accesses user data associated with a user. Although not shown in FIG. 3, the data verification service 150 may cause a UI for uploading, or providing a link to, the user data (e.g., a CV, résumé, a web page, or other document) to be provided to the user or another user completing an electronic form based on the user data on behalf of the user. The UI may allow the user to provide a social network profile or a link to such profile (e.g., a LinkedIn profile, a Facebook profile, a company or institution bio page, etc.). In some cases, such a UI may include a UI element for enabling the user to designate the type of the document (e.g., CV, résumé, a web page, or other document), and based on the type of the document designated using the UI element, the data verification service 150 may apply different data parsing rules for different document types.

The user data may indicate, among other things, a time period and a user entity corresponding to the time period. For example, the data verification service 150 may access a CV uploaded by the user, where the CV lists the college that the user attended (e.g., UCI) and indicates when the user was there (e.g., 2004-2008). In other cases, the user data may provide any number of schools and employers that the user was previously (and/or is currently) associated with and the corresponding time periods during which such associations existed (or continue to exist). Depending on the format of the user data, the data verification service 150 may perform OCR on the user data. For example, based on determining that the user data is in an image format, the data verification service 150 may perform OCR so that the text portion of the image can be converted into one or more machine-readable text strings. In some cases, the user data may be provided to the data verification service 150 by a user at the user device 102 by copying and pasting a block of text into a user-fillable electronic form (e.g., text field in a Web browser). The user data may be converted into a single text string for parsing by the data parser 152.

Next, at block 304, the data verification service 150 determines the time period based on the user data. For example, the data verification service 150 may determine the time period based on a time period text string in the user data. The time period text string may be dates and/or date ranges in the user data and may be in one of a variety of date formats. For example, the dates may include month names (e.g., January-March), abbreviated month names (e.g., Jan.-Mar.), one and two digit months with a four-digit year (e.g., 1/2015-3/2015), one and two digit months with a two-digit year (1/15-3/15), full dates (1/1/2015-3/1/2015), and the like. Some additional examples include "Jan. 1, 2015-Sep. 1, 2017," "1/1/2015-1/9/2017," "from 01-01-15 to 09-01-17," "2015/01/01-2017/09/01," "Jan. 1st, 2015-Sep. 1st, 2017," etc. In some cases, the user data may include date ranges having a keyword instead of a traditional date (e.g., "01/02/1998-Present," "Fall 2008-Current," "2017-Active," etc.). The data verification service 150 may utilize string search algorithms to process the text string in the user data and determine one or more dates and/or date ranges that match one of the predetermined date patterns. The determined dates and/or date ranges may be converted into a standard, machine-readable date format.

Depending on the format of the dates in the user data (e.g., 2-digit month and 2-digit year), there may be some ambiguity as to which portion of a given date is the month, year, or day (e.g., 01/03/02). In such cases, other dates in the user data may be able to be used to resolve the ambiguity. For example, if the ambiguous date "01/03/02" is followed by "–30/11/02," the data verification service 150 may determine that "01/03/02-30/11/02" is equivalent to "Mar. 1, 2002-Nov. 30, 2002." If the immediately preceding or following date does not resolve the ambiguity, the data verification service 150 may continue to process other dates in the user data until the ambiguity is resolved. In some cases, the data verification service 150 may resolve the ambiguity in favor of the standard date format used in the geographical location of the user.

At block 306, the data verification service 150 extracts, from a location in the user data that is proximate to a location of the time period text string in the user data, a user entity text string indicative of the user entity corresponding to the determined time period. For example, if the data verification service 150 determines a given date range based on a text string (e.g., "time period text string") in the user data, the data verification service 150 may look before or after the text string in the user data to identify another text string (e.g., "user entity text string") indicative of the user entity corresponding to the determined date range. In an example of a CV including the text "UCI School of Medicine—2014-2018," the date range determined at block 304 may be 2014-2018 and the user entity text string extracted from the user data at block 306 may be "UCI School of Medicine." In some embodiments, the text string indicative of the user entity may be a text string located between the time period text string and another time period text string that precedes the time period text string (e.g., "[user entity text string A] [time period text string A] [user entity text string B] [time period text string B] . . . "). In other embodiments, the text string indicative of the user entity may be a text string located between the time period text string and another time period text string that follows the time period text string (e.g., "[time period text string A] [user entity text string A] [time period text string B] [user entity text string B] . . . ").

In some embodiments, subsequent to determining the dates and/or date ranges in the user data, the data verification service 150 splits the text string in the user data into multiple text strings based on the determined dates and/or date ranges. Each of the multiple text strings may correspond to a single item or entry in the user's CV or résumé (e.g., "UCI School of Medicine—2014-2018," in a CV entry that ends with a date range, and "2014-2018—UCI School of Medicine," in a CV entry that begins with a date range). For example, the data parser 152 of the data verification service 150 may identify all the date ranges in the user data, and use the identified data ranges as delimiters to divide up the text string in the user data into multiple text strings that each contain a single date range. In some cases, the data verification service 150 may detect date-like objects in the user data and use those objects as delimiters in dividing up the text string in the user data (e.g., without ascertaining the specific date(s) represented by the date-like object). In some cases, the entity corresponding to the date range precedes the date range in the resulting text string. In other embodiments, the entity corresponding to the date range follows the date range in the resulting text string.

The data verification service 150 may use key phrase extraction algorithms to extract key phrases from the user data with known data sources as training sets. For example, the data verification service 150 may run each entry in a list of medical schools through the algorithm as the training set, and as a result, obtain a list of key phrases to look for when processing the user data. The key phrase selection may depend on, for example, the frequency at which a given key phrase appears in the training set. For example, "UCI," "School," and "Medicine" may be identified as key phrases. In some cases, "UCI School of Medicine" may be identified as a key phrase. When the data verification service 150 detects a key phrase in the user data, the data verification service 150 may map the key phrase to an entity whose information is stored in the data repository 140 as part of the entity data 142 and increase a confidence value (e.g., a value indicating a level of trust in a mapping between two text strings) associated with the mapping.

At block 308, the data verification service 150 accesses a data store storing data associated with a plurality of known or available entities. The plurality of entities may include a first entity associated with a first text string (e.g., name of the first entity), a second entity associated with a second text string (e.g., name of the second entity), and so on. For example, the data verification service 150 may access any data store (e.g., the data repository 140, data sources 160, or another data store not shown in FIG. 1) that stores information relating to a plurality of entities that may be found in the user data.

At block 310, the data verification service 150 determines, based on a comparison between the user entity text string and the first text string, that the first entity in the data store matches the user entity corresponding to the time period. For example, the data verification service 150 may determine that the first entity matches the user entity based on the user entity text string being identical to the first text string (e.g., name, address, or other identifier associated with the first entity). In some cases, the data verification service 150 may determine that the first entity matches the user entity based on the extracted user entity text string being similar, but not identical, to the first text string of the first entity. For example, the first text string may sound the same as (or similar to) the extracted user entity text string (e.g., "color" vs. "colour"). In some embodiments, the data matcher 154 of the data verification service 150 may utilize a phonetic algorithm such as Soundex to identify a matching entity in the data repository 140 having a name that is not identical to the extracted user entity text string but sound the same or similar. In some cases, the phonetic algorithm may output a score indicative of the phonetic similarity between the extracted user entity text string and the name of an entity in the data repository 140, and the data matcher 154 may determine that a given entity is a match based on the score being higher than a threshold value. In other cases, the phonetic algorithm may output a binary value (e.g., 1 for "similar," and 0 for "not similar") based on whether the phonetic similarity between the extracted user entity text string and the name of an entity in the data repository 140 satisfies a threshold similarity condition. In some cases, the data verification service 150 converts each known abbreviation and/or acronym in the extracted user entity text string into the corresponding full spelling prior to the comparison. For example, "Irvine Medical Center ER" may be converted to "Irvine Medical Center Emergency Room," "2050 K Ave." may be converted to "2050 K Avenue," and "OC Med School" may be converted to "Orange County Medical School."

In some embodiments, the data matcher 154 may search the entity data 142 multiple times at varying tolerance levels. For example, the data matcher 154 may first determine whether the entity data 142 includes any entity having a name that is identical to the extracted user entity text string. Upon determining that the entity data 142 does not include any entity having a name that is identical to the extracted user entity text string, the data matcher 154 may then determine whether the entity data 142 includes any entity having a name that exhibits a 90% similarity relative to the extracted user entity text string. Upon determining that the entity data 142 does not include any entity having a name that exhibits a 90% similarity relative to the extracted user entity text string, the data matcher 154 may then determine whether the entity data 142 includes any entity having a name that exhibits a 80% similarity relative to the extracted user entity text string, and so on. The data matcher 154 may repeat this process until a matching entity is found in the entity data 142. Although a single data repository is shown in FIG. 1, in some cases, the data matcher 154 may access multiple data repositories to find a matching entity for the user entity indicated in the user data.

In some embodiments, information other than the name of the entity may be used to adjust the confidence. In one example, the list of medical schools includes Joseph Smith Medical School in New York, N.Y. and John Smith Medical School in San Diego, Calif., and the user-submitted document includes "J. Smith Medical School." In this example, not knowing where the school is may cause the confidence value to be about 50% for each school. On the other hand, knowing that the school is in San Diego would increase the confidence that the school is "John Smith Medical School," not "Joseph Smith Medical School." Any combination of entity name, address, city, state, zip code, and the like may be used to increase or decrease the confidence.

Figure 4:
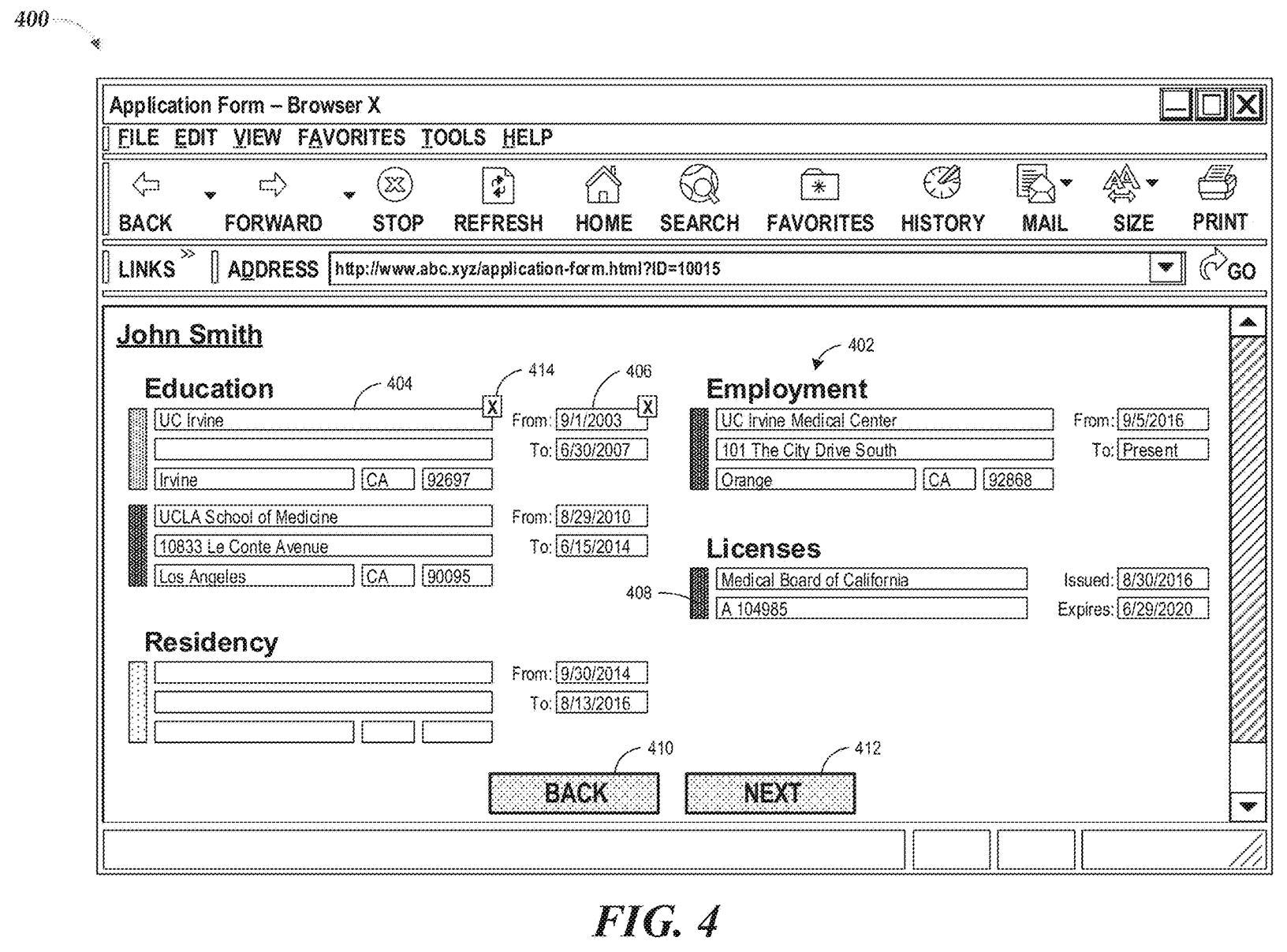

At block 312, the data verification service 150 outputs a user interface (UI) for presentation on a computing device. The UI may include a first UI element indicative of the time period and a second UI element indicative of the first text string associated with the first entity. An example of the UI is shown in FIG. 4. The first and second UI elements may be text fields in a fillable electronic form. In the UI, the first UI element may be pre-populated with the time period determined at block 304 and the second UI element may be pre-populated with the first text string of the first entity determined to be a matching entry of the user entity at block 310. One or both of the first and second UI elements may be presented along with a graphical UI element that visually indicates the strength or confidence corresponding to the UI element. For example, if the data verification service 150 determines the time period at block 304 with 70% confidence (e.g., due to the ambiguity in the date range), the graphical UI element associated with the first UI element may visually indicate (e.g., using a color coding scheme) that the information filled into the first UI element has a medium confidence level (e.g., yellow in a red-yellow-green scale, with green being the highest confidence level and red being the lowest). In another example, if the data verification service 150 determines at block 310 that the first entity matches the user entity with 95% confidence (e.g., based on the first entity being very similar to the user entity indicated in the user data but not being identical), the graphical UI element associated with the second UI may visually indicate that the information filled into the first UI element has a high confidence level (e.g., green in the red-yellow-green scale).

While FIG. 3 has been described above with reference to an embodiment in which the data verification service 150 accesses the user data, determines the time period, extracts the user entity text string, and etc., in other embodiments, all or a portion of the method 300 may be performed by one of user devices 102 or another computing device not shown in FIG. 1. For example, executable code for accessing the user data, determining the time period, extracting the user entity text string, accessing the data store, determining the match, and outputting the UI may be provided to a user, who can then use the code to perform one or more of the steps described above. Thus, in some embodiments, the data parsing and verification process is performed entirely outside the data verification system 101. In other embodiments, the data parsing and verification process is performed partially by the data verification system 101 and partially by one or more other computing systems.

Although the medical profession and medical schools are used as examples, the techniques described herein can be applied to other professions or industries such as dental, legal, academia, and the like.

Example User Interface Including Pre-Populated Data

FIG. 4 illustrates an example user interface (UI) 400 displaying a fillable electronic form. The UI 400 includes UI elements 402-414. For example, the UI includes form sections 402 ("education" section, "residency" section, "employment" section, and "licenses" section), entity fields 404, date fields 406, confidence indicators 408, a back button 410, a next button 412, and text clearing buttons 414. The form sections 402 may be extracted from the user data (e.g., from headings in the user data) and presented to the user for further modification. Alternatively, the form sections 402 may be fixed and may not vary from one set of user data to another set of user data. The entity field 404 may be a text field that is pre-populated with a text string extracted from the user data (e.g., a CV of "John Smith" in the example of FIG. 4). In other cases, the pre-populated text string may be taken from a matching entity stored in the data repository 140 (e.g., the name and address of the matching entity). The date field 406 may be a text field that is pre-populated with the date determined based on the user data (e.g., a CV of "John Smith" in the example of FIG. 4). Alternatively, the date field 406 may be a UI element that allows user selection of a date (e.g., via a pop-up calendar) and may have the date determined based on the user data as the initial date value. The confidence indicator 408 may indicate the confidence associated with the corresponding pre-populated text string or value. In the example of FIG. 4, the confidence indicator 408 indicates the confidence associated with the name of the licensing-issuing board "Medical Board of California" and the license number "A 104985." In some cases, each text string or value may have its own confidence indicator (e.g., one for "Medical Board of California" and another for "A 104985"). Additionally or alternatively, one or more of the date fields 406 may have corresponding confidence indicators. As shown in FIG. 4, the text clearing buttons 414 can be provided for one or more of the fields or sections of the electronic form. In some cases, the text clearing button 414 is placed on or near a text field associated with a confidence level lower than a threshold level (e.g., "medium" level), and is not displayed for another text field associated with a confidence level greater than the threshold level (e.g., "high" level). In other cases, the text clearing button 414 is displayed for all text fields. In yet other cases, the text clearing button 414 is not included in the UI 400, and the pre-populated text string in a given text field is removed upon user selection of the text field. The system 101 may determine the confidence scores for specific fields based on a set of rules, such as rules that consider any combination of the following: (1) degrees of match between the user-supplied entity names and the entity names found in the data repository 140, (2) the degrees of uniqueness of particular entity names, (3) whether multiple "close matches" exists in the data repository 140 for a given user-supplied entity name, (4) ambiguities in date formats, and (5) whether a user-supplied entity name includes one or more abbreviations.

The back button 410 takes the user to the previous page or UI (e.g., a CV upload page from which the CV of "John Smith" used to pre-populate the UI elements 404 and 406 was uploaded). The next button 412 takes the user to the next page or UI (e.g., a review page in which the user can review and confirm the data entered for "John Smith" before submission). Alternatively, the next button 412 may be a submit button that, when selected by the user, causes the data entered in the UI elements 404 and 406 to be submitted to the server 120 of the data verification system 101 or another server for processing the submitted data. The text clearing button 414 may, when selected by the user, cause any pre-populated (or user-entered or modified) data corresponding to the text clearing button 414 to be cleared. In the example of FIG. 4, upon user selection of the text clearing button 414, the text string(s) pre-populated into the entity field 404 may be cleared (e.g., the text string "UC Irvine" may be deleted from the entity field 404). In some cases, both of the name portion and the address portion of the entity field 404 are cleared upon user selection of the text clearing button 414.

In some embodiments, if the data verification service 150 does not find a matching entity in the data repository 140 or a match found in the data repository 140 has a confidence value lower than a threshold level (e.g., has a "low" level), the data verification service 150 may cause the entity field 404 in the UI to be blank (e.g., as shown in the "residency" section). Alternatively, the data verification service 150 may cause the entity field 404 to be pre-populated with the user entity text string extracted from the user data. In either case, the data verification service 150 may cause a warning to be presented to the user (e.g., "This institution does not seem to exist." or "We could not find a match in our database."). In some embodiments, if the data verification service 150 finds multiple close matches for a given text field in the UI, the data verification service 150 may cause the UI to include the multiple close matches and prompt the user to select one of them.

The user viewing the UI 400 can modify any of the pre-populated UI elements (e.g., the education, employment, and licenses sections) and/or fill-in the UI elements that are left blank (e.g., the entity fields in the residency section) before selecting the next button 412. Alternatively, the user can select the next button 412 without modifying any of the pre-populated UI elements, thereby approving the pre-populated data. As described in greater detail below with reference to FIG. 5, the data verification service 150 can update the mapping data 144 based on whether the user approves the pre-populated data (e.g., by selecting the next button 412 without modifying some or all of the pre-populated data in the electronic form) or rejects the pre-populated data (e.g., by selecting the text clearing button 414 or by modifying or deleting some or all of the pre-populated data in the electronic form).

Example Method of Updating Mapping Data Based on User Approval

Figure 5:
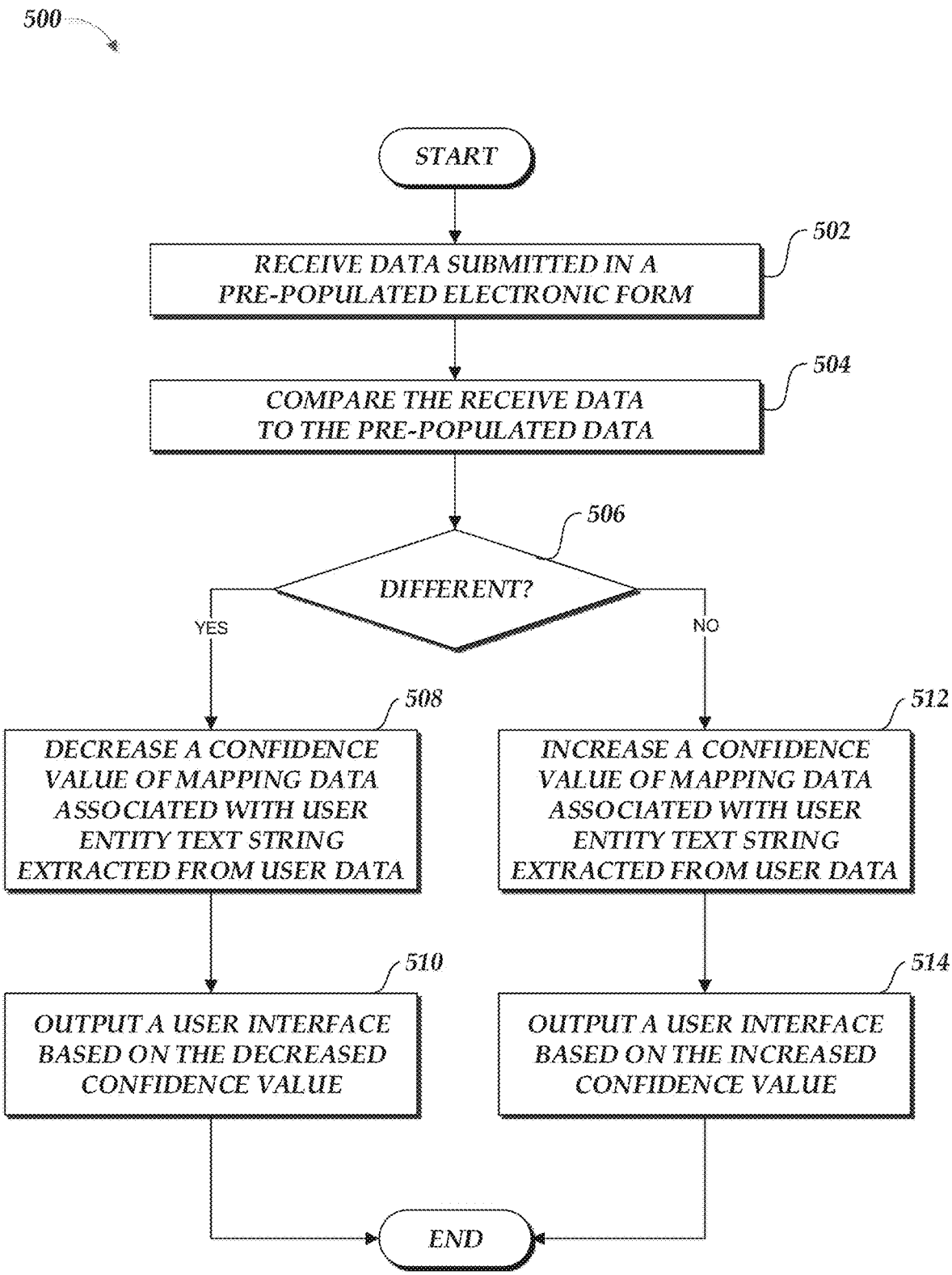
FIG. 5 is a flow diagram illustrating an example method for updating the mapping data based on user feedback in accordance with aspects of the present disclosure.

FIG. 5 is a flow diagram of an illustrative method 500 implemented at least in part by the data verification service 150 for updating the mapping of user entities to entities in the database based on user feedback. While the illustrative method will be described below as being implemented by the data verification service 150, in other embodiments, one or more of the illustrated steps may be implemented by a component of the data verification system 101 not shown in FIG. 1 or another computing system not shown in FIG. 1. For convenience, the steps of the example method 500 are described as being performed by the data verification service 150.

At block 502 of the illustrative method 500, the data verification service 150 receives data submitted in a pre-populated electronic form. As described with reference to FIG. 3, the data verification service 150 may have identified an entity stored in the data repository 140 that matches a user entity text string extracted from user-submitted data (e.g., CV associated with the user), and pre-populated a UI element based on the matching entity (e.g., by automatically filling the entity fields with the name and address of the matching entity). With or without modifying the pre-populating data, the user viewing the UI element may have submitted the data in the electronic form (e.g., by selecting the next button 412 in FIG. 4). Upon the user selection of the next button 412 (or a similar accept/submit button), the data associated with the various UI elements at that time may have been transmitted to a server (e.g., server 120).

For example, the user entity text string extracted from the user data may have been "UCI Medical" and the matching entity found in the entity data 142 may have had an entity name of "UCI School of Medicine." Based on this match, the data verification service 150 may have created a mapping between "UCI Medical" and "UCI School of Medicine" (e.g., mapping data 144) and pre-populated one of the entity fields in the UI presented to the user with "UCI School of Medicine." Upon viewing the UI, the user may have modified the pre-populated name to "UCI Medical Center." Once the user selects the next button 412, the modified name "UCI Medical Center" is submitted, and the data verification service 150 receives the submitted data. Alternatively, upon viewing the UI, the user may have selected the next button 412 without modifying the pre-populated "UCI School of Medicine," which is then received by the data verification service 150. The data verification service 150 may store the received data and the pre-populated data as user feedback 146 in the data repository 140.

At block 504, the data verification service 150 compares the received data to the pre-populated data that was initially presented to the user in the UI 400. The comparison may occur at the entity level (e.g., name, address, and any other information pre-populated based on the matching entity), at the text string level (e.g., comparing the received name to the pre-populated name, comparing the received street address to the pre-populated street address, comparing the received city name to the pre-populated city name, etc.), or at the word level (e.g., comparing "UCI" to the corresponding text string of the matching entity, comparing "Medical" to the corresponding text string of the matching entity, etc.).

At block 506, the data verification service 150 determines whether the received data is different from the pre-populated data. If the data verification service 150 determines that the received data is different from the pre-populated data, the data verification service 150 proceeds to block 508. Otherwise, the data verification service 150 proceeds to block 512. If multiple comparisons are performed by the data verification service 150 at block 504, the data verification service 150 may perform the tasks at blocks 508 and 510 (or 512 and 514) for each of the comparisons. In some cases, if a given UI element was not pre-populated or left blank, the data verification service 150 may treat any received data to be different from the pre-populated data (e.g., since the pre-populated data does not exist or has a null value) and proceed to block 508.

At block 508, the data verification service 150 decreases a confidence value of the mapping data associated with the user entity text string extracted from the user data. Based on the user feedback indicating that the matching entity that the data verification service 150 found in the data repository 140 was incorrect, the data verification service 150 can decrease the confidence value associated with the mapping data mapping the user entity text string found in the user data to the data associated with the matching entity in the data repository 140.

As shown in Table 1 below, each entry in the mapping data 144 may be associated with a confidence value. In Table 1, the first column shows data extracted or determined based on the user data (e.g., CV uploaded by the user), the second column shows data found in the data repository 140 (e.g., entity data 142), and the third column shows the confidence value associated with each mapping created between the data extracted or determined based on the user data and the data found in the data repository 140. Each row shown in Table 1 represents such a mapping.

TABLE 1

Example mapping data.

| Data extracted from user data | Data found in data repository | Confidence value |
|---|---|---|
| UCI Medical | UCI School of Medicine | 60% |
| UCI Medical | UCI Medical Center | 40% |
| UCI Med School | UCI School of Medicine | 100% |
| J. Smith Medical School | Joseph Smith Medical School | 50% |
| J. Smith Medical School | John Smith Medical School | 50% |
| (name = J. Smith Medical School, city = New York) | Joseph Smith Medical School | 100% |
| (name = J. Smith Medical School, city = San Diego) | John Smith Medical School | 100% |
| CT | Court | 85% |
| CT. | Court | 90% |

In the example of Table 1, based on the determination at block 506 that the received data is different from the pre-populated data, the data verification service 150 may decrease the confidence value shown in the first row (from 60% to 40%, for example). In some cases, the data verification service 150 may adjust the confidence values of other mappings involving the same user entity text string (e.g., value in the first column). For example, based on a determination that the received data (e.g., "UCI Medical Center") matches the data for another entity stored in the data repository 140 for another mapping (e.g., second row in Table 1), the data verification service 150 may increase the confidence value associated with that mapping (40% to 60%, for example).

Additionally or alternatively, in some embodiments, the data verification service 150 may update the mapping data 144 associated with the user entity text string used by the data verification service 150 to identify the matching entity in the entity 142 prior to presenting the UI 400. In the example described at block 502, the mapping data 144 may indicate that "UCI Medical" is mapped to "UCI School of Medicine." If the mapping data 144 does not map "UCI Medical" to any other entity, the data verification service 150 may update this mapping data to indicate that "UCI Medical" is mapped to "UCI Medical Center," based on the determination at block 506 that the received data is different from the pre-populated data.

In some embodiments, the feedback data provided by many users may be aggregated and used to supplement or otherwise improve the mappings. For example, if a number of users put "UCI Med" in their CVs and the system did not find a match, the data verification service 150 may have pre-populated a UI element with the raw data (e.g., "UCI Med") or left the UI element blank. In such an example, if a threshold number or percentage (or all) of those users then proceeded to modify the UI element to read "UCI Medical School," the data verification service 150 may create, based on the feedback data from the threshold number or percentage of users, a mapping that associates "UC Irvine Med" with "UCI Medical School." As another example, the data verification service 150 may cause a UI element to be pre-populated with a particular entity name (e.g., "UCI School of Medicine"), based on a given mapping in the mapping data 144 (e.g., a mapping that associates "UCI Medical" with "UCI School of Medicine"). However, if the entity name pre-populated based on the given mapping is modified to one or more other entity names by a threshold number or percentage of users seeing such pre-populated entity name, the data verification service 150 may cause the given mapping to be removed from the mapping data 144. In some cases, if the threshold number or percentage of users modified the pre-populated entity name to the same name (e.g., if all of the users modified the entity name to "UCI Medical Center"), the data verification service 150 may modify the given mapping (e.g., such that "UCI Medical" is mapped to "UCI Medical Center" instead).

At block 510, the data verification service 150 outputs a UI based on the decreased confidence value and/or updated mapping data. For example, subsequent to block 508, the data verification service 150 may extract the user entity text string "UCI Medical" from another set of user data (e.g., CV of another user or the same user that is subsequently processed). When the data verification service 150 accesses the data store and searches the entity data 142 as described with reference to FIG. 3, the data verification service 150 may find a different matching entity (e.g., one having a name "UCI Medical Center") based on the updated mapping data 144 (e.g., based on the increased confidence value associated with mapping to a different entity or based on the user entity text string "UCI Medical" being mapped to a different entity). In other embodiments, even with the decreased confidence value, the data verification service 150 may still identify the same entity (e.g., "UCI School of Medicine") in the data repository 140 as the matching entity.

Based on the matching entity found in the data repository 140, the data verification service 150 can output a UI such that when the UI is presented to the user, the UI includes a UI element that is pre-populated with data associated with a different matching entity (e.g., "UCI Medical Center"). The confidence indicator associated with the pre-populated data may be different from that previously presented in the prior UI. For example, if the "UCI School of Medicine" pre-populated in the previous UI had a "medium" confidence indicator (e.g., in yellow), the "UCI Medical Center" pre-populated in the current UI may have a "high" indicator (e.g., in green), based on the confirmation provided by the user feedback. In some cases, the UI may include a UI element that is pre-populated with data associated with the same matching entity (e.g., "UCI School of Medicine") but with a different confidence indicator. For example, if the "UCI School of Medicine" pre-populated in the previous UI had a "high" confidence indicator (e.g., in green), the "UCI School of Medicine" pre-populated in the current UI may have a "medium" or "low" indicator (e.g., in yellow or red).

In some embodiments, the actions described above as being performed by the data verification service 150 at block 508 are performed only after the same comparison result is detected more than a threshold number of times. For example, in some cases, the data verification service 150 may decrease the confidence value associated with the mapping of "UCI Medical" to "UCI School of Medicine" after determining that the pre-populated text string "UCI School of Medicine" was modified to another text string more than five times. As another example, the data verification service 150 may cause "UCI Medical" to be mapped to "UCI Medical Center" instead of "UCI School of Medicine" after determining that the pre-populated text string "UCI School of Medicine" was modified to "UCI Medical Center" more than three times.

With continued reference to FIG. 5, as discussed above, if the data verification service 150 determines that the received data is not different from the pre-populated data, the data verification service 150 proceeds to block 512. At block 512, the data verification service 150 increases a confidence value of the mapping data associated with the user entity text string extracted from the user data. Based on the user feedback indicating that the matching entity that the data verification service 150 found in the data repository 140 was correct, the data verification service 150 can increase the confidence value associated with the mapping data mapping the user entity text string found in the user data to the data associated with the matching entity in the data repository 140.

In the example of Table 1, based on the determination at block 506 that the received data is not different from the pre-populated data, the data verification service 150 may increase the confidence value shown in the first row (from 60% to 70%, for example). In some cases, the data verification service 150 may adjust the confidence values of other mappings involving the same user entity text string (e.g., value in the first column). For example, based on a determination that another mapping stored in the data repository 140 (e.g., second row in Table 1) includes the same user entity text string (e.g., "UCI Medical"), the data verification service 150 may decrease the confidence value associated with that mapping (40% to 30%, for example).

At block 514, the data verification service 150 outputs a UI based on the increased confidence value. For example, subsequent to block 512, the data verification service 150 may extract the user entity text string "UCI Medical" from another set of user data (e.g., CV of another user or the same user that is subsequently processed). When the data verification service 150 accesses the data store and searches the entity data 142 as described with reference to FIG. 3, the data verification service 150 may find the same matching entity (e.g., one having a name "UCI School of Medicine") based on the updated mapping data 144 (e.g., based on the increased confidence value associated with mapping to the same entity). Based on this matching entity, the data verification service 150 can output a UI such that when the UI is presented to the user, the UI includes a UI element that is pre-populated with data associated with the matching entity (e.g., "UCI School of Medicine"). The confidence indicator associated with the pre-populated data may be different from that previously presented in the prior UI. For example, if the "UCI School of Medicine" pre-populated in the previous UI had a "medium" confidence indicator (e.g., in yellow), the "UCI School of Medicine" pre-populated in the current UI may have a "high" indicator (e.g., in green), based on the confirmation provided by the user feedback.

Although in the example of FIG. 5, the feedback is received by the same component that also performs the matching of user entities, in other embodiments, one component performs the matching (e.g., based on the mapping data), and another component receives and analyzes the feedback data and updates the mapping data as needed.

Example User Interface Including Pre-Populated Data

Figure 6:
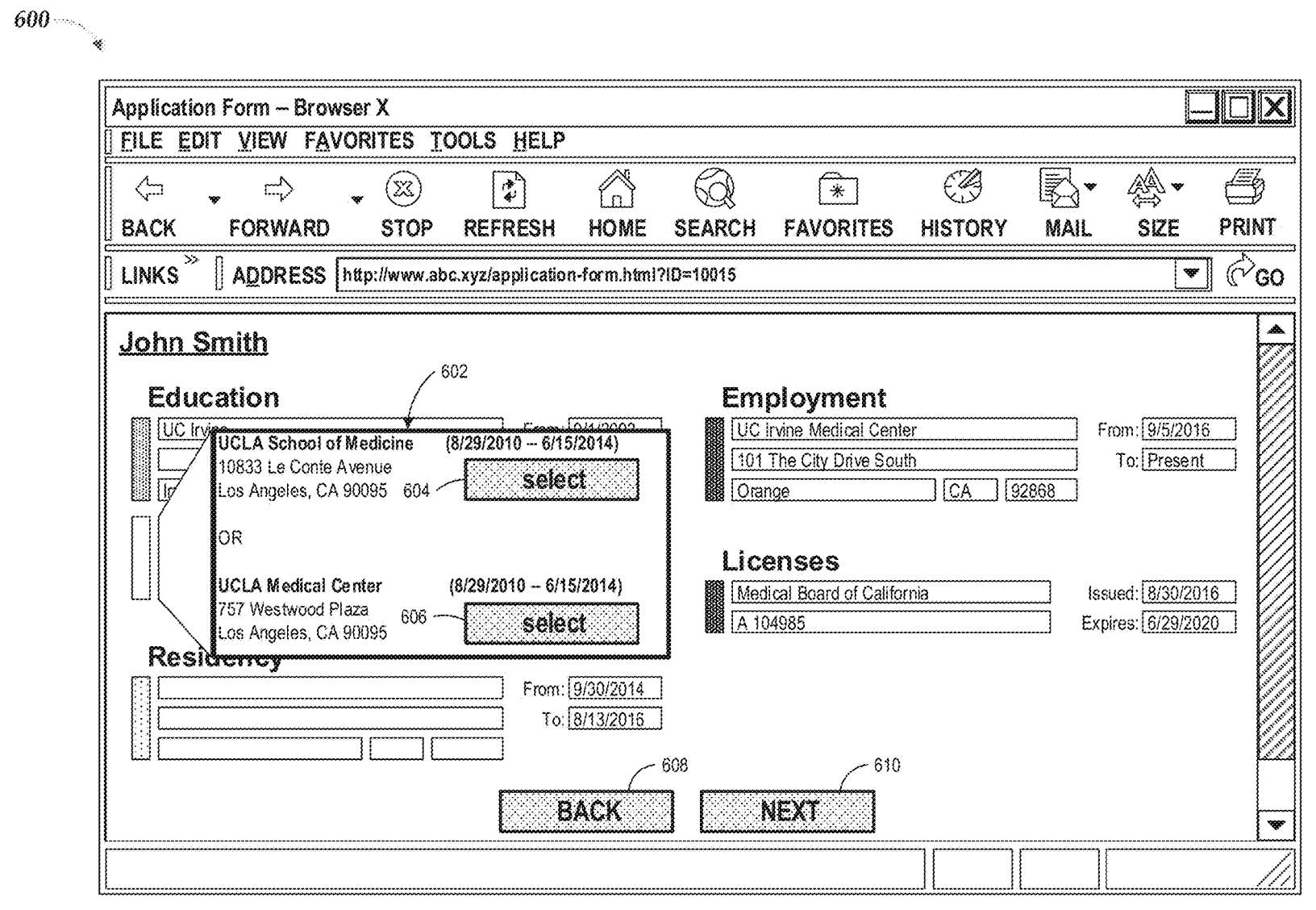

FIG. 6 illustrates an example user interface (UI) 600 displaying a fillable electronic form. The UI 600 includes UI elements 602-606. For example, the UI includes a pop-up window 602 including two entities found in the data repository 140. One entity has an entity name "UCLA School of Medicine" and the other entity has an entity name "UCLA Medical Center." The corresponding entity addresses and date ranges are also shown in the pop-up window 602. The entity "UCLA School of Medicine" is associated with a select button 604, and the entity "UCLA Medical Center" is associated with a select button 606.

Upon user selection of the select button 604, the entity field corresponding to the pop-up window 602 is populated with "UCLA School of Medicine" and the corresponding address and date range. Alternatively, upon user selection of the select button 606, the entity field corresponding to the pop-up window 602 is populated with "UCLA Medical Center" and the corresponding address and date range. The data verification service 150 may receive an indication of which one of the two options was selected in response to the user selection of one of the select buttons 604 or 606 and prior to the user selection of the next/submit button. Alternatively, the data verification service 150 may receive an indication of which one of the two options was selected in response to the user selection of the next/submit button and subsequent to the user selection of one of the select buttons 604 or 606. As described with reference to FIG. 5, the data verification service 150 may store the received indication as user feedback 146 (e.g., "UCLA School of Medicine" is selected as the correct one of the two options, "UCLA Medical Center" is eliminated as the incorrect one of the two options, etc.). In response to the received indication, the data verification service 150 may update the mapping data 144 as described with reference to FIG. 5.

In some embodiments, based on identifying two or more potential dates and/or entities, the data verification service 150 causes the UI 600 to include all of the dates and/or entities for further selection by the user. For example, a date included in the user data may be ambiguous (e.g., 01/05/99, which could be Jan. 5, 1999 or May 1, 1999). In such an example, the data verification service 150 may cause the UI 600 to include both dates, and the user can be prompted to select one of the two dates. Alternatively, in some cases, the data verification service 150 causes only the date or entity having the highest confidence value to be included in the UI 600.

Other Considerations

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a", "an", or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be implemented within a form that does not provide all of the features and benefits set forth herein, as some features can be used or practiced separately from others. All such modifications and variations are intended to be included herein within the scope of this disclosure. Further, additional embodiments created by combining any two or more features or techniques of one or more embodiments described herein are also intended to be included herein within the scope of this disclosure.

What is claimed is:

1. A system for parsing and verifying user-submitted data, the system comprising:
    a data store comprising physical computer hardware and configured to store text associated with a plurality of institutions; and
    a data verification server comprising one or more physical computing devices and in communication with the data store, wherein the data verification server is configured to:
        receive a user data file associated with a user, the user data file including text indicative of at least an institution currently or previously associated with the user and a time period during which the institution has been or was associated with the user;

extract the text included in the user data file;

identify, using one or more date format patterns, a date range text portion in the text that indicates the time period during which the institution has been or was associated with the user;

identify, from a string segment that (i) immediately precedes the date range text portion within the text or (ii) immediately follows the date range text portion within the text, an institution text portion that indicates the institution with which the user has been or was associated during the time period;

determine that the institution text portion is not identical to the text associated with any of the plurality of institutions stored in the data store;

select, as a matching institution, one of the plurality of institutions that is not identical to the institution text portion but has a highest likelihood of matching the institution indicated by the institution text portion among the plurality of institutions stored in the data store; and cause a user interface (UI) including a user-fillable electronic form to be displayed on a user computing device, wherein the user-fillable electronic form includes (a) a first data range text field pre-filled with the time period indicated by the date range text portion and further configured to receive additional user input modifying the time period pre-filled in the first date range text field, (b) a first visual indicator indicative of a first level of trust in a first mapping between the time period pre-filled in the first date range text field and the date range text portion identified in the text included in the user data file, (c) a first institution text field automatically pre-filled by the user computing device with the text associated with the matching institution selected from the plurality of institutions stored in the data store and further configured to receive additional user input modifying the text pre-filled in the first institution text field, and (d) a second visual indicator indicative of a second level of trust in a second mapping between two different texts, wherein one of the two different texts is the text that has been automatically pre-filled in the first institution text field by the user computing device and associated with the matching institution selected from the plurality of institutions stored in the data store, and the other one of the two different texts is the institution text portion identified in the text included in the user data file that is different from the text that has been pre-filled in the first institution text field of the user-fillable electronic form, wherein the second visual indicator indicates how different the text that has been automatically pre-filled is from the institution text portion from the user data file, wherein the user-fillable electronic form further includes a second institution text field that includes pre-filled text automatically pre-filled in the second institution text field by the user computing device, wherein the pre-filled text in the second institution text field does not appear in the user data file associated with the user but indicates additional information about the matching institution selected using the text included in the user data file other than an institution name of the matching institution, and a need for the user to manually enter data into the electronic form is reduced, wherein the data verification server is further configured to cause:
(i) the first institution text field that is pre-filled and does not have a button for clearing the pre-filled text based on the first institution text field being associated with a first confidence level that exceeds both a first confidence threshold and a second confidence threshold,
(ii) a third institution text field that is pre-filled but includes the text-clearing button based on the third institution text field being associated with a second confidence level that exceeds the first confidence threshold but is lower than the second confidence threshold, and
(iii) a fourth institution text field that is not pre-filed with any text based on the fourth institution text field being associated with a third confidence level that is lower than both the first confidence threshold and the second confidence threshold,
to be displayed, at a given point in time, at different positions on the same display screen of the user computing device, wherein (i)-(iii) are displayed alongside visual indicators that indicate the first confidence level, the second confidence level, and the third confidence level, respectively.

2. The system of claim 1, wherein the UI further includes a disapproval UI element for disapproving the text associated with the matching institution that is pre-filled in the one or more institution text fields, wherein the data verification server is further configured to:
receive, from the user computing device, an indication that the disapproval UI element has been activated; and
cause the matching institution stored in the data store to have a decreased likelihood of matching the institution indicated by the institution text portion without removing the matching institution from the data store.

3. The system of claim 1, wherein the text included in the user data file represents a curriculum vitae (CV) of the user.

4. The system of claim 1, wherein the text-clearing button is to be displayed on or near the first institution text field, the text-clearing button configured to, upon activation, cause the pre-filled text in the first institution text field to be removed from the first institution text field.

5. The system of claim 1, wherein the second visual indicator indicates the second level of trust that is based on a degree of uniqueness of (i) the text that has been pre-filled in the first institution text field and associated with the matching institution selected from the plurality of institutions stored in the data store, and (ii) the institution text portion identified in the text included in the user data file that is different from the text that has been pre-filled in the first institution text field of the user-fillable electronic form.

6. The system of claim 1, wherein the UI further includes a confirm button configured to cause, upon activation, user confirmation to be stored in the data store with respect to the text pre-filled in the first institution text field, wherein the data verification server is further configured to cause a second UI to be displayed on another user computing device of another user based on the user confirmation and another institution text portion identical to that identified in the text included in the user data file, the second UI including a subsequent visual indicator that indicates a higher level of trust than the second level of trust indicated by the second visual indicator despite the second visual indicator and the subsequent visual indicator both indicating the level of trust between a mapping between the same pair of two different texts.

7. The system of claim 6, wherein the data verification server is further configured to compare the text pre-filled into the first institution text field to confirmed text present in the first institution text field when the confirm button was activated, and in response to the pre-filled text being different from the confirmed text, decrease the level of trust in the second mapping between (i) the pre-filled text associated with the matching institution selected from the plurality of institutions stored in the data store, and (ii) the institution text portion identified in the text included in the user data file that is different from the pre-filled text.

8. A computer-implemented method, comprising:
as implemented by one or more computing devices configured with specific executable instructions,
accessing user data associated with a user, the user data indicative of at least a time period and a user entity corresponding to the time period;
determining the time period based on a time period text string in the user data;
extracting, from a string segment in the user data that (i) immediately precedes the time period text string in the user data or (ii) immediately follows the time period text string in the user data, a user entity text string indicative of the user entity corresponding to the time period;
accessing a data store storing data associated with a plurality of entities, the plurality of entities including a first entity associated with a first text string;
determining, based on a comparison between the user entity text string and the first text string, that the first entity matches the user entity corresponding to the time period; and
outputting a user interface (UI) for presentation on a computing device, wherein the UI includes (a) a first UI element indicative of the time period and further configured to receive additional user input modifying the time period indicated by the first UI element, (b) a first visual indicator indicative of a first level of trust in a first mapping between the time period indicated by the first UI element and the time period text string in the user data, (c) a second UI element indicative of the first text string associated with the first entity and further configured to receive additional user input modifying the first text string indicated by the second UI element, and (d) a second visual indicator indicative of a second level of trust in a second mapping between two different texts, wherein one of the two different texts is the first text string indicated by the second UI element and associated with the first entity of the plurality of entities stored in the data store, and the other one of the two different texts is the user entity text string extracted from the user data that is different from the first text string indicated by the second UI element, wherein the second visual indicator indicates how different the first text string is from the user entity text string extracted from the user data,
wherein the second UI element indicates, in addition to the first text string, additional information about the first entity that was identified using the user entity text string extracted from the user data, wherein the additional information does not appear in the user data associated with the user and includes information other than an entity name of the first entity,
wherein the computer-implemented method further comprises displaying, at a given point in time, at different positions on the same display screen of the computing device:
(i) the second UI element that is pre-filled with the first text string and does not have a button for clearing the pre-filled first text string based on the second UI element being associated with a first confidence level that exceeds both a first confidence threshold and a second confidence threshold,
(ii) a third UI element that is pre-filled with a second text string but includes a text-clearing button for clearing the pre-filled second text string based on the third UI element being associated with a second confidence level that exceeds the first confidence threshold but is lower than the second confidence threshold, and
(iii) a fourth UI element that is not pre-filed with any text based on the fourth UI element being associated with a third confidence level that is lower than both the first confidence threshold and the second confidence threshold,
wherein (i)-(iii) are displayed alongside visual indicators that indicate the first confidence level, the second confidence level, and the third confidence level, respectively.

9. The computer-implemented method of claim 8, wherein the second UI element is a user-editable text field including the first text string.

10. The computer-implemented method of claim 8, wherein extracting the user entity text string comprises identifying a key phrase in the user data that is closest to the time period among one or more key phrases that precede the time period in the user data.

11. The computer-implemented method of claim 8, wherein extracting the user entity text string comprises identifying a key phrase in the user data that is closest to the time period among one or more key phrases that follow the time period in the user data.

12. The computer-implemented method of claim 8, further comprising converting the time period into a predetermined date format.

13. The computer-implemented method of claim 8, further comprising accessing multiple data sources that each store entity information associated with a respective plurality of entities, and storing the entity information accessed from the multiple data sources in the data store.

14. The computer-implemented method of claim 8, wherein the additional information not appearing in the user data but determined using the user entity text string extracted from the user data comprises contact information associated with the first entity, wherein the contact information does not appear in the user data.

15. The computer-implemented method of claim 8, further comprising causing a fifth UI to be included in the UI, wherein the fifth UI is configured to, upon user activation, increase the second level of trust in the second mapping between (i) the first text string indicated by the second UI element and associated with the first entity of the plurality of entities stored in the data store and (ii) the user entity text string extracted from the user data that is different from the first text string indicated by the second UI element.

16. The computer-implemented method of claim 8, wherein the first visual indicator and the second visual indicators provide different visual indications, when presented on the computing device, based on the first level of trust being different from the second level of trust.

17. Non-transitory physical computer storage storing computer executable instructions that, when executed by one or more computing devices, configure the one or more computing devices to:
- access user data associated with a user, the user data indicative of a plurality of user entities currently or previously associated with the user, the plurality of user entities including at least a first user entity and a second user entity different from the first user entity;
- extract, from string segments in the user data that (i) immediately precede one of a plurality of time period text strings in the user data or (ii) immediately follow one of the plurality of time period text strings in the user data, a plurality of user entity text strings corresponding to the respective user entities indicated in the user data, the plurality of user entity text strings including at least a first user entity text string corresponding to the first user entity and a second user entity text string corresponding to the second user entity;
- access a data store storing data associated with a plurality of entities, the plurality of entities including at least a first entity associated with a first text string and a second entity associated with a second text string;
- determine, based on a comparison between the first user entity text string and the first text string, that the first entity matches the first user entity;
- determine, based on a comparison between the second user entity text string and the second text string, that the second entity matches the second user entity; and
- output a user interface (UI) for presentation on a computing device, wherein the UI includes (a) a first UI element indicative of the first text string associated with the first entity in the data store and further configured to receive additional user input modifying the first text string indicated by the first UI element, (b) a first visual indicator indicative of a first level of trust in a first mapping between a first set of two different texts, wherein one of the first set of two different texts is the first text string indicated by the first UI element and associated with the first entity of the plurality of entities stored in the data store, and the other one of the first set of two different texts is the first user entity text string extracted from the user data that is different from the first text string indicated by the first UI element, (c) a second UI element indicative of the second text string associated with the second entity in the data store and further configured to receive additional user input modifying the second text string indicated by the second UI element, and (d) a second visual indicator indicative of a second level of trust in a second mapping between a second set of two different texts, wherein one of the second set of two different texts is the second text string indicated by the second UI element and associated with the second entity of the plurality of entities stored in the data store, and the other one of the second set of two different texts is the second user entity text string extracted from the user data that is different from the second text string indicated by the second UI element, wherein the second visual indicator indicates how different the second text string is from the second user entity text string extracted from the user data,
- wherein the second UI element indicates, in addition to the second text string, additional information about the second entity that was identified using the second user entity text string extracted from the user data, wherein the additional information does not appear in the user data associated with the user and includes information other than an entity name of the second entity,
- wherein the computer executable instructions, when executed by the one or more computing devices, further configure the one or more computing devices to cause:
  - (i) the second UI element that is pre-filled with the first text string and does not have a button for clearing the pre-filled first text string based on the second UI element being associated with a first confidence level that exceeds both a first confidence threshold and a second confidence threshold,
  - (ii) a third UI element that is pre-filled with a second text string but includes a text-clearing button for clearing the pre-filled second text string based on the third UI element being associated with a second confidence level that exceeds the first confidence threshold but is lower than the second confidence threshold, and
  - (iii) a fourth UI element that is not pre-filed with any text based on the fourth UI element being associated with a third confidence level that is lower than both the first confidence threshold and the second confidence threshold,
- to be displayed, at a given point in time, at different positions on the same display screen of the user computing device, wherein (i)-(iii) are displayed alongside visual indicators that indicate the first confidence level, the second confidence level, and the third confidence level, respectively.

18. The non-transitory physical computer storage of claim 17, wherein the instructions, when executed by the one or more computing devices, further configure the one or more computing devices to search the data store for an entry associated with the first user entity text string, and search the data store for an entry associated with the second user entity text string.

19. The non-transitory physical computer storage of claim 17, wherein the instructions, when executed by the one or more computing devices, further configure the one or more computing devices to cause the UI to include a fifth UI element configured to, upon user activation, cause user feedback associated with one or both of the first text string and the second text string to be stored in the data store.

20. The non-transitory physical computer storage of claim 17, wherein the instructions, when executed by the one or more computing devices, further configure the one or more computing devices to cause mapping data to be stored in the data store, wherein the mapping data indicates at least (i) the first level of trust in the first mapping between the first text string indicated by the first UI element and associated with the first entity of the plurality of entities stored in the data store and the first user entity text string extracted from the user data that is different from the first text string indicated by the first UI element, and (ii) the second level of trust in the second mapping between the second text string indicated by the second UI element and associated with the second entity of the plurality of entities stored in the data store and the second user entity text string extracted from the user data that is different from the second text string indicated by the second UI element.

21. The non-transitory physical computer storage of claim 17, wherein the instructions, when executed by the one or more computing devices, further configure the one or more computing devices to cause mapping data to be stored in the data store, wherein the mapping data indicates at least a third level of trust in a third mapping between the first user entity text string and the first entity.

22. The non-transitory physical computer storage of claim 17, wherein the instructions, when executed by the one or more computing devices, further configure the one or more computing devices to cause the UI to include a fifth UI element indicating multiple entities in the plurality of entities in the data store for user selection.

23. The non-transitory physical computer storage of claim 17, wherein the instructions, when executed by the one or more computing devices, further configure the one or more computing devices to extract, from the user data, the plurality of time periods corresponding to the respective user entities indicated in the user data.

24. The non-transitory physical computer storage of claim 17, wherein the instructions, when executed by the one or more computing devices, further configure the one or more computing devices to cause a fifth UI element in the UI to be left blank based on a determination that a third user entity indicated by the user data does not match any of the entities in the data store.

\* \* \* \* \*